April 26, 1966     E. R. PAYNE     3,248,127

TRAILER HITCH ACCESSORY

Filed June 19, 1964

INVENTOR.
E. R. PAYNE
BY
*Milford A. Jeter*

United States Patent Office 3,248,127
Patented Apr. 26, 1966

1

3,248,127
TRAILER HITCH ACCESSORY
Earnest R. Payne, 1028 Smith Ave., Richland, Wash.
Filed June 19, 1964, Ser. No. 376,393
5 Claims. (Cl. 280—406)

The present invention relates to the support of moving loads and more particularly to the uniform distribution of loads on a tractor and trailer so that no ground engaging means such as a wheel is excessively over-loaded.

Heretofore automotive equipment such as trucks and automobiles have been used to tow two-wheeled trailers but a substantial portion of the trailer load was applied to the draw bar at the rear of the tractor vehicle, resulting in sagging of the rear of the tractor and corresponding sagging of the front of the trailer while the front wheels of the tractor were relieved of a substantial portion of their weight, resulting in excessive loading of the rear wheels of the tractor and frequently resulting in failure of the rear tires of the tractor.

An object of the present invention is to provide equipment whereby the sagging connection between a trailer and tractor can be raised to the ideal position while distributing the load of the trailer over all of the wheels of the tractor and trailer.

Another object of the invention is to provide a simple, readily separable connection between a trailer and tractor whereby proper loading of each set of wheels is accomplished while permitting the trailer-tractor combination to be used in the usual manner.

Other and further objects will be apparent as the description proceeds and upon reference to the accompanying drawing wherein.

Figure 1:
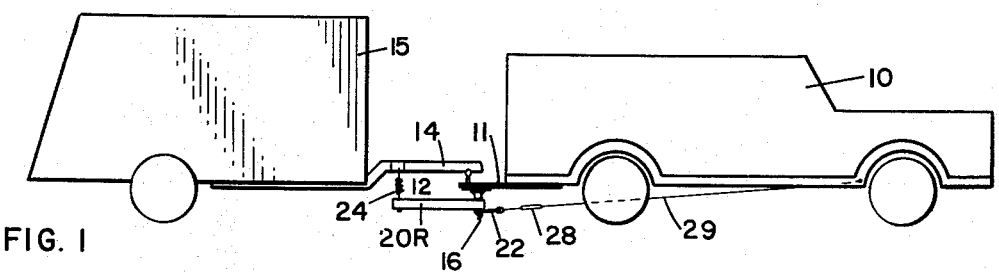
FIGURE 1 is a small schematic side elevation of a vehicle such as a station wagon pulling a two-wheeled trailer such as a house trailer and showing the load equalizing equipment of the present invention in operative position with some details omitted for clarity.
Figure 2:
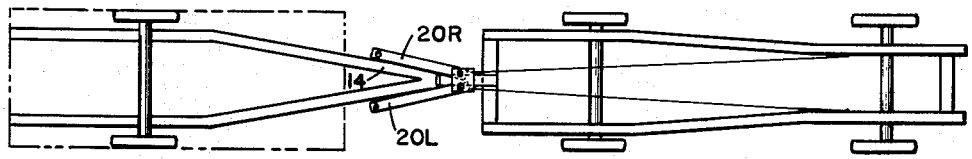
FIGURE 2 is a bottom view of the tractor-trailer combination of FIGURE 1.
Figure 3:
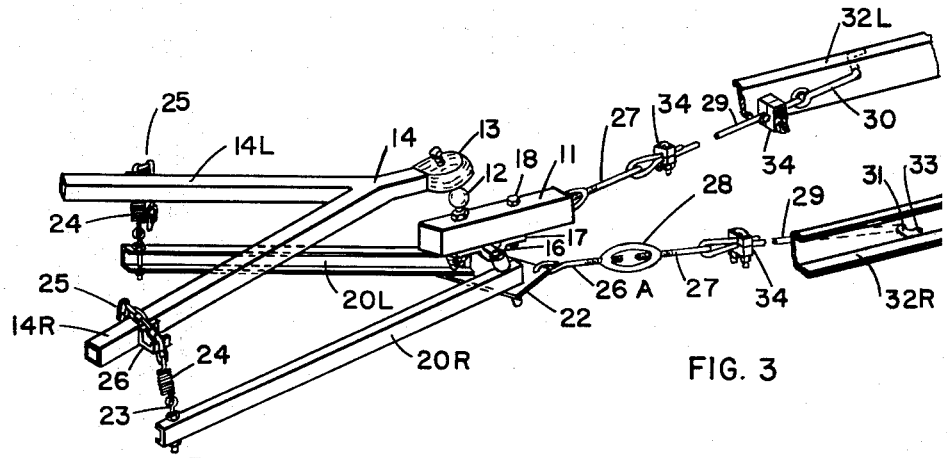
FIGURE 3 is a fragmentary perspective showing the tow bar of the trailer in vertically displaced relation for illustrative purposes only and showing the load equalizing equipment of the present invention in operative relation to the draw bar of the tractor and tow bar of the trailer.
Figure 4:
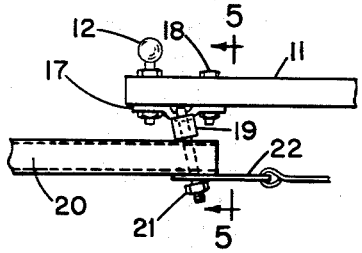
FIGURE 4 is a fragmentary side elevation of the connection between the load distributing equipment of the present invention and the draw bar of the tractor.
Figure 5:
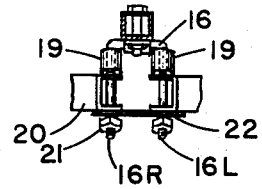
FIGURE 5 is a vertical section taken substantially on line 5—5 of FIGURE 4.
Figure 6:
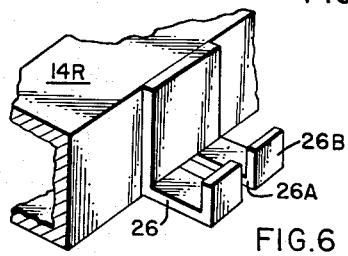
FIGURE 6 is an enlarged perspective of the clevis for adjustably retaining the chain.

Briefly, the present invention provides a strut hingedly connected to the draw bar of a tractor for movement about a horizontal axis transverse to the direction of movement of the tractor and pivotally connected to the strut are lever means which extend rearwardly with the rear end supported by adjustably yieldable means to a rearward portion of the trailer with tension means extending from the bottom end of the strut member to a portion of the frame of the tractor well ahead of the rear ground engaging means thereby providing a type of inverted king truss which exerts an upward force on the strut with the reaction being taken by the tractor and trailer in a manner to increase the load on the front ground engaging means such as wheels of the tractor and on the trailer ground engaging means such as wheels while appreciably reducing the downward force on the draw bar of the tractor.

A tractor vehicle such as a station wagon 10 is provided with the usual draw bar 11 having a ball 12 supported therefrom which receives the spherical socket 13

2 of a tow bar 14 having diverging portions 14L and 14R connected in the usual manner to the two-wheeled trailer 15, which structure is well-known in the art.

A strut in the form of an inverted U-bolt 16 is hingedly mounted by its bight portion to the under-surface of the draw bar 11 by means of a U-strap 17 held in position by the bolt securing the ball 12 at the rear end and a second bolt 18 passing through the draw bar and through the forward end of the U-strap. Mounted on each leg of the U-bolt 16 is a spacer 19 and a lever 20 of channel shape with the channel provided with apertures in the flanges adjacent one end receiving the corresponding leg of the U-bolt 16 with the parts on the right of the vehicle having the postscript R and the parts on the left of the vehicle having the postscript L. A rectangular plate 22 is provided with a pair of holes receiving the lower ends 16L, 16R of the U-bolt 16, and the plate 22, the lever 20 and the spacer 19 are held in assembled position on the U-bolt by lock-nuts 21 with the adjustment being such that pivotal movement of the lever 20 is permitted about the cooperating axis of each leg of the U-bolt to correspond with the pivotal movement of the tractor and trailer in turning a corner and to provide for attachment to the diverging portions of the tow bar 14.

Secured to the rear end of each lever 20 is an eye bolt 23 passing through both of the flanges and being secured by a lock-nut with a spring 24 of the tension type secured by one of its ends to the eye of the eye-bolt 23 and having a chain 25 secured to its other end with the chain 25 being received in a chain-receiving slot in a clevis formed by an angle bracket 26 provided with a slot 26A between upstanding ears 26B to serve as means to effectively retain any link of the chain in any position of adjustment while permitting the tension on the spring 24 to be controlled in accordance with the load distribution required in the combination.

The plate 22 is provided with a second pair of holes each of which receives a hook of a threaded member 26 forming part of a turn-buckle assembly including a second eye or hook bolt 27 and a connecting turn buckle 28. A cable 29 has one of its ends secured to the eye in the threaded member 27 and other end received in the eye of a hook member 30 having an off-set 31 of a size to pass through an aperture in the frame 32 of the automobile adjacent the front end thereof and having a prolongation 33 which engages the opposite surface of the frame member thereby retaining the off-set hook 30 in tense condition preventing displacement in use while permitting assembly and disassembly. The cable 28 is secured by the usual U-clamp 34 to provide the necessary adjustable length for the particular vehicle used as a tractor to obtain the desired adjustment.

Applicant has provided readily mountable equipment for existing automobiles and trailers which can be applied and removed in a minimum of time while assuring proper adjustment to produce the most desirable loading of the vehicles.

By way of illustration only, the invention has been practiced with channel bars 20, 30 inches long, 2 inches deep and one inch wide; a U-bolt 16, 5 inches long by 2¼ inches wide made of 9/16 stock; spacers 19, 1⅝ inch sections of ½ inch pipe; plate 22, 3 inches long by 2 inches wide; and spring 24 similar to the hood counterbalance of a 1948 Ford automobile.

The U-bolt 16 is shown at an acute angle to channel bars 20, but may also be at right angle thereto.

It will be evident that changes may be made in the practice of the invention within the valid scope of the appended claims.

I claim:
1. A vehicle assembly comprising a tractor vehicle having forward and rear sets of wheels, means to drive one set of wheels, a trailer positioned behind said tractor, a draw bar on said tractor, a tow bar on said trailer, means to detachably and articulatingly connect said tow bar to said draw bar, an inverted U-bolt hingedly mounted by the bight portion thereof to said draw bar, a spacer mounted on each leg of the U-bolt adjacent the bight portion and abutting the bight portion thereof, a channel bar pivoted by its flanges at one end to each leg of said U-bolt with the upper flange abutting its cooperating spacer, a connection plate having one pair of holes receiving said legs of said U-bolt, securing means maintaining said U-bolt, said spacers, said channel bars, and said connection plate in assembled relation while permitting pivotal movement thereof, yieldable resilient means on the other end of each channel bar and adjustably connectable to said towing bar normally urging said other ends of said channels upwardly, a second pair of holes on said connection plate, a turn buckle and cable assembly extending from each of said holes of said second pair of holes, and means to detachably connect said turn buckle and cable assembly to the forward portion of said tractor vehicle above the said connection plate whereby an upward force is applied to said connection of said tow bar and said draw bar urging the forward end of said trailer and the rearward portion of said tractor upwardly relieving some of the load on said rear wheels of said tractor and distributing said some of said load on the front wheels of said tractor and on the wheels of said trailer.

2. A vehicle assembly comprising a tractor vehicle having forward and rear ground supporting means, a trailer positioned behind said tractor, a draw bar on said tractor, a tow bar on said trailer, means to detachingly and articulatingly connect said tow bar to said draw bar, an inverted U-bolt hingedly mounted by the bight portion thereof to said draw bar, a spacer mounted on each leg of the U-bolt adjacent the bight portion and abutting the bight portion thereof, a channel bar pivoted by its flanges at one end to each leg of said U-bolt with the upper flange abutting its cooperating spacer, a connection plate having one pair of holes receiving said legs of said U-bolt, securing means maintaining said U-bolt, said spacers, said channel bars, and said connection plate in assembled relation while permitting pivotal movement thereof, yieldable resilient means on the other end of each channel bar and adjustably connectable to said towing bar normally urging said other ends of said channels upwardly, a second pair of holes on said connection plate, a turn buckle and cable assembly extending from each of said holes of said second pair of holes, and means to detachably connect said turn buckle and cable assembly to the forward portion of said tractor vehicle above the said connection plate whereby an upward force is applied to said connection of said tow bar and said draw bar urging the forward end of said trailer and the rearward portion of said tractor upwardly relieving some of the load on said rear ground engaging means of said tractor and distributing said some of said load on the front ground engaging means of said tractor and on the ground engaging means of said trailer.

3. Equipment to obtain non-sagging of the connection between the draw bar of a tractor and tow bar of the trailer comprising a strut having two legs, means for hingedly mounting the strut for pivotal movement to the draw bar with the legs beneath the draw bar extending downwardly, separate lever means pivotally connected to each leg of the strut, means to provide a yieldable upward force on the other end of each of said lever means, tension means for application between the said free ends of the legs of said strut and a portion of the tractor vehicle in front of the ground engaging supporting means adjacent the draw bar whereby when the equipment is applied to a tractor and trailer the tension of the tension means and the upward force on the other end of the lever means results in an upward force on the strut to properly support the portion of the load of the tractor and trailer adjacent the connection of the draw bar and tow bar.

4. The invention according to claim 3 in which the legs of the strut are positively connected together to move as a unit.

5. Equipment to obtain non-sagging of the connection between the draw bar of a tractor and the tow bar of the trailer comprising a U-bolt providing a strut, a U-strap for hingedly receiving the bight portion of the U-bolt for hinged pivotal movement therebetween, means to secure said U-strap with the bight portion of the U-bolt adjacent the under side of the draw bar with the legs extending downwardly, separate lever means pivotally connected to each leg of said U-bolt, means to provide a yieldable upward force on the other end of each of said lever means, tension means for application between said free ends of said U-bolt and a portion of the tractor vehicle in front of the ground engaging supporting means adjacent the draw bar whereby when the equipment is applied to a tractor and trailer the tension of the tension means and the upward force on the other end of the lever means results in an upward force on the strut to properly support the portion of the load of the tractor and trailer adjacent the connection of the draw bar and tow bar.

References Cited by the Examiner

UNITED STATES PATENTS

| | | | |
|---|---|---|---|
| 2,772,098 | 11/1956 | Seeley | 280—406 |
| 2,772,893 | 12/1956 | Wettstein | 280—406 |
| 2,828,143 | 3/1958 | DaVatz | 280—406 |
| 3,093,393 | 6/1963 | Madden | 280—406 |

LEO FRIAGLIA, *Primary Examiner.*